(12) United States Patent
Vablais et al.

(10) Patent No.: US 7,397,469 B2
(45) Date of Patent: Jul. 8, 2008

(54) ELECTRONIC MODULE FOR SENSING PEN MOTION

(75) Inventors: William C. Vablais, Woodinville, WA (US); Lyndsay Williams, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 11/153,771

(22) Filed: Jun. 14, 2005

(65) Prior Publication Data

US 2005/0243656 A1  Nov. 3, 2005

Related U.S. Application Data

(63) Continuation of application No. 09/820,258, filed on Mar. 28, 2001, now Pat. No. 6,906,703.

(51) Int. Cl.
*G06F 3/033* (2006.01)

(52) U.S. Cl. ....................................... 345/179

(58) Field of Classification Search ................. 345/156, 345/174–179, 1.1, 502, 503, 157, 163, 168, 345/158; 382/186, 187, 124, 120; 715/512; 707/500; 340/146.3; 178/18.01, 18.1–18.03; 206/371
See application file for complete search history.

(56) References Cited

U.S. PATENT DOCUMENTS

| | | | | |
|---|---|---|---|---|
| 4,128,829 | A * | 12/1978 | Herbst et al. | 382/120 |
| 6,279,014 | B1 * | 8/2001 | Schilit et al. | 715/512 |
| 6,539,101 | B1 * | 3/2003 | Black | 382/124 |
| 6,546,134 | B1 * | 4/2003 | Shrairman et al. | 382/186 |
| 6,577,299 | B1 * | 6/2003 | Schiller et al. | 345/179 |
| 2002/0002562 | A1 * | 1/2002 | Morgan et al. | 707/500 |
| 2002/0028018 | A1 * | 3/2002 | Hawkins et al. | 382/187 |
| 2002/0126105 | A1 * | 9/2002 | O'Donnell, Jr. | 345/179 |
| 2003/0085869 | A1 * | 5/2003 | Lapstun et al. | 345/156 |
| 2003/0090459 | A1 * | 5/2003 | Lapstun et al. | 345/156 |
| 2003/0095097 | A1 * | 5/2003 | Lapstun et al. | 345/156 |

* cited by examiner

*Primary Examiner*—Prabodh Dharia
(74) *Attorney, Agent, or Firm*—Workman Nydegger (57) ABSTRACT

An electronic module that inserts into or is otherwise associated with a pen or other writing instrument. The electronic module includes a mechanism, such as an accelerometer, for detecting pen motion. The electronic module is preferably mounted in a substitute ink cartridge for a pen. Ballistic information generated by the accelerometer is transmitted via the radio transmitter to a computer (e.g., a personal computer), where processing and/or storage of the accelerometer information may occur. The accelerometer information may be used, for example, for handwriting recognition or digital ink generation. The electronic module is preferably provided in a casing that is shaped like an ink cartridge. Contemporary pens usually include two cartridges within the pen, a first that supplies ink to the nib, and a second that presses the first against the nib. The components may be mounted in a cartridge that is placed in the position of the second cartridge.

20 Claims, 6 Drawing Sheets

ELECTRONIC MODULE FOR SENSING PEN MOTION

CROSS-REFERENCE TO RELATED APPLICATION

This is application is a continuation of U.S. patent application Ser. No. 09/820,258 filed Mar. 28, 2001, and entitled "ELECTRONIC MODULE FOR SENSING PEN MOTION." which issued as U.S. Pat. No. 6,906,703 on Jun. 14, 2005.

FIELD OF THE INVENTION

The invention relates generally to digital ink, and more particularly to writing instruments for generating digital ink information.

BACKGROUND OF THE INVENTION

Digital ink technology enables a user to write and draw on the touch-sensitive screen of a handheld PC or other writing tablet with a stylus or other pointing device, and for that information to be input into the computer, perhaps with some enhancements such as handwriting recognition or display. The technology provides a convenient means for applications to accept input from a user without using a keyboard. For a user, taking notes or drawing sketches using digital ink technology is a convenient way to enter text or other information into a computer without having to use a keyboard.

Most contemporary handwriting analyzers utilize a tablet computer and a stylus. A user writes on the tablet computer with the stylus, and coordinate, pressure, vector, and/or other information generated by the contact of the stylus with the tablet computer is utilized to recognize the writing strokes of the user. A problem with this system is that writing on a computer tablet does not feel the same as writing on paper. In addition, people prefer to write with more contemporary, ergonomic pens rather than with the thin stylus that is typically provided with a tablet computer.

SUMMARY OF THE INVENTION

The present invention provides an electronic module that inserts into or is otherwise associated with a pen or other writing instrument. The electronic module includes a mechanism for detecting pen motion, such as an accelerometer, and is preferably mounted in a cavity that is designed for a substitute ink cartridge for a pen. An accelerometer may be used to measure the relative acceleration and deceleration of the pen in the X and Y axes, which in turn may be used to provide a two-dimensional vector stream representing the pen's movement. Alternatively, the accelerometer may be arranged so that it senses tilt of the pen. In such a case, the information from the accelerometer may be used to plot relative X and Y components that represent the pen movements that are generated by a user.

In addition to an accelerometer, a microcontroller, a battery, and a radio transmitter are mounted inside the module. Ballistic information generated by the accelerometer is transmitted via the radio transmitter to a computer (e.g., a personal computer), where processing and/or storage of the accelerometer information may occur. The accelerometer information may be used, for example, for handwriting recognition or digital ink generation.

The accelerometer and related components are preferably mounted within a cartridge that can be substituted for a conventional ink cartridge for a pen. Contemporary pens usually include two cartridges within the pen, a first cartridge that supplies ink to the nib, and a second cartridge that presses the first cartridge against the nib. The components may be mounted in a cartridge that is placed in the position of the second cartridge. By mounting the components in this location, the pen functions normally as a writing instrument, and the user's writing experience is not altered. The components may alternatively be placed within the first cartridge (i.e., the cartridge that supplies ink to the nib), wherein either the pen does not write, or the components within the first cartridge are shielded from, or impervious to, the ink.

The components in the electronic module are relative inexpensive. If the pen is lost, there is no security problem as there is no user data kept within the pen. If mounted inside a pen, the module does not interfere with the user's handwriting motions or the aesthetic appearance of the pen. If handwriting recognition software is used, the user is provided with a hard copy of notes at the same time that a digital copy is being generated. In addition, power on/off may be accomplished by movement detection, so no on/off switch would violate the outer shape of the user's pen.

Other advantages will become apparent from the following detailed description when taken in conjunction with the drawings, in which:

DETAILED DESCRIPTION

Exemplary Operating Environment

Figure 1:
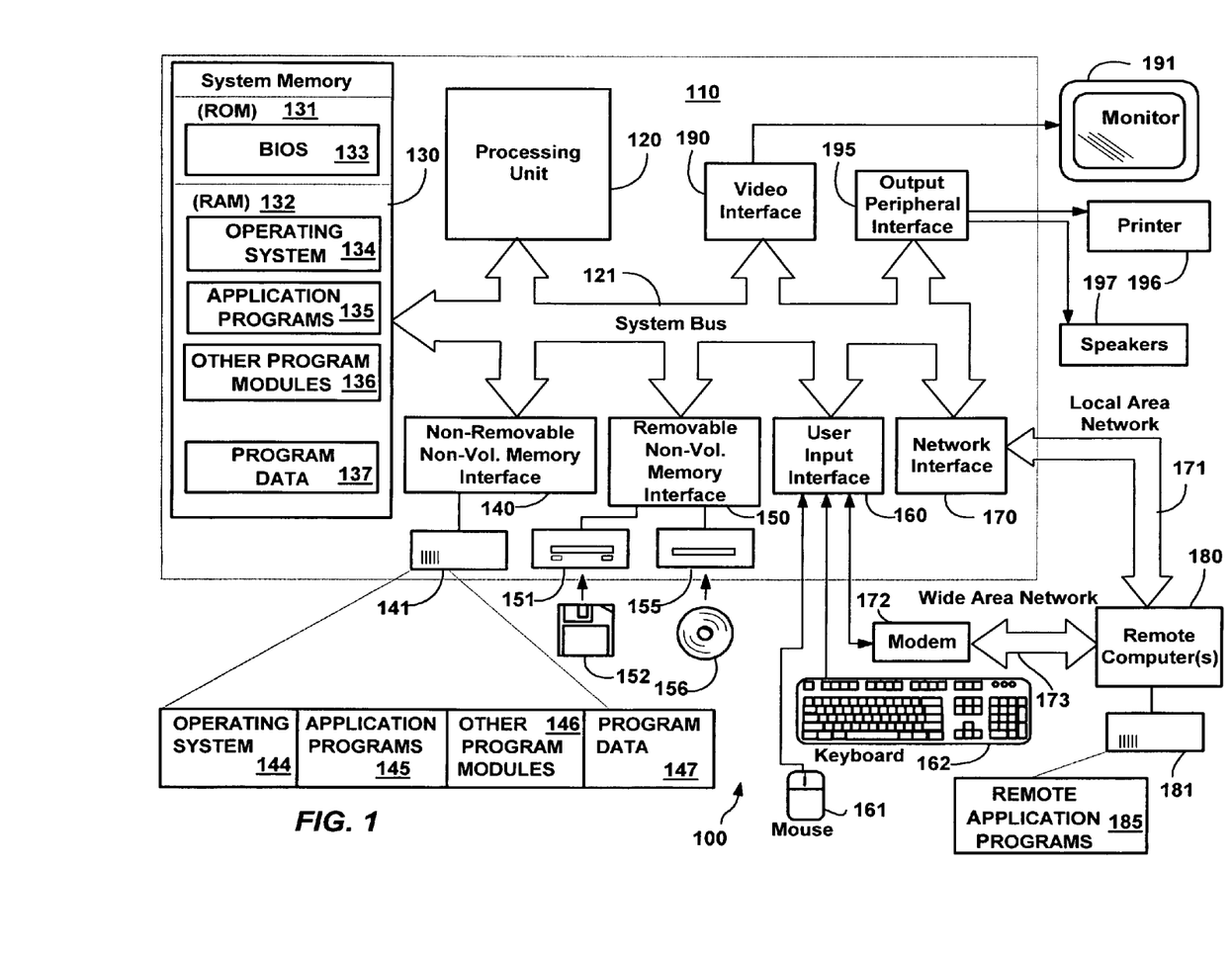
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of an handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN)

171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Electronic Module for Sensing Pen Motion

Typically, a user writing on a touch-sensitive screen or tablet generates digital ink information with a stylus or other writing instrument. Generally, digital ink technology stores and/or processes information about stylus, mouse, or other pointer movements, along with enhanced information such as calculated vector information, pressure, timing, strokes, angle of stylus, italic and bold states, and the like. There are a variety of different digital ink formats, and the additional information that the format can store or process with the pointer movements varies for the different applications.

In summary, the present invention is directed to an electronic module that may be inserted inside a pen, or otherwise may be attached to a pen or other writing instrument. The electronic module includes components that generate data as a result of pen movements. The data may be used to create digital ink information. In accordance with one aspect of the present invention, the electronic module includes a ballistic information generator (e.g., an accelerometer) that generates ballistic pen movement and/or ballistic pen tilt information in response to movements of the pen. The ballistic information may then be used for handwriting recognition, digital ink generation, or the like.

Figure 2:
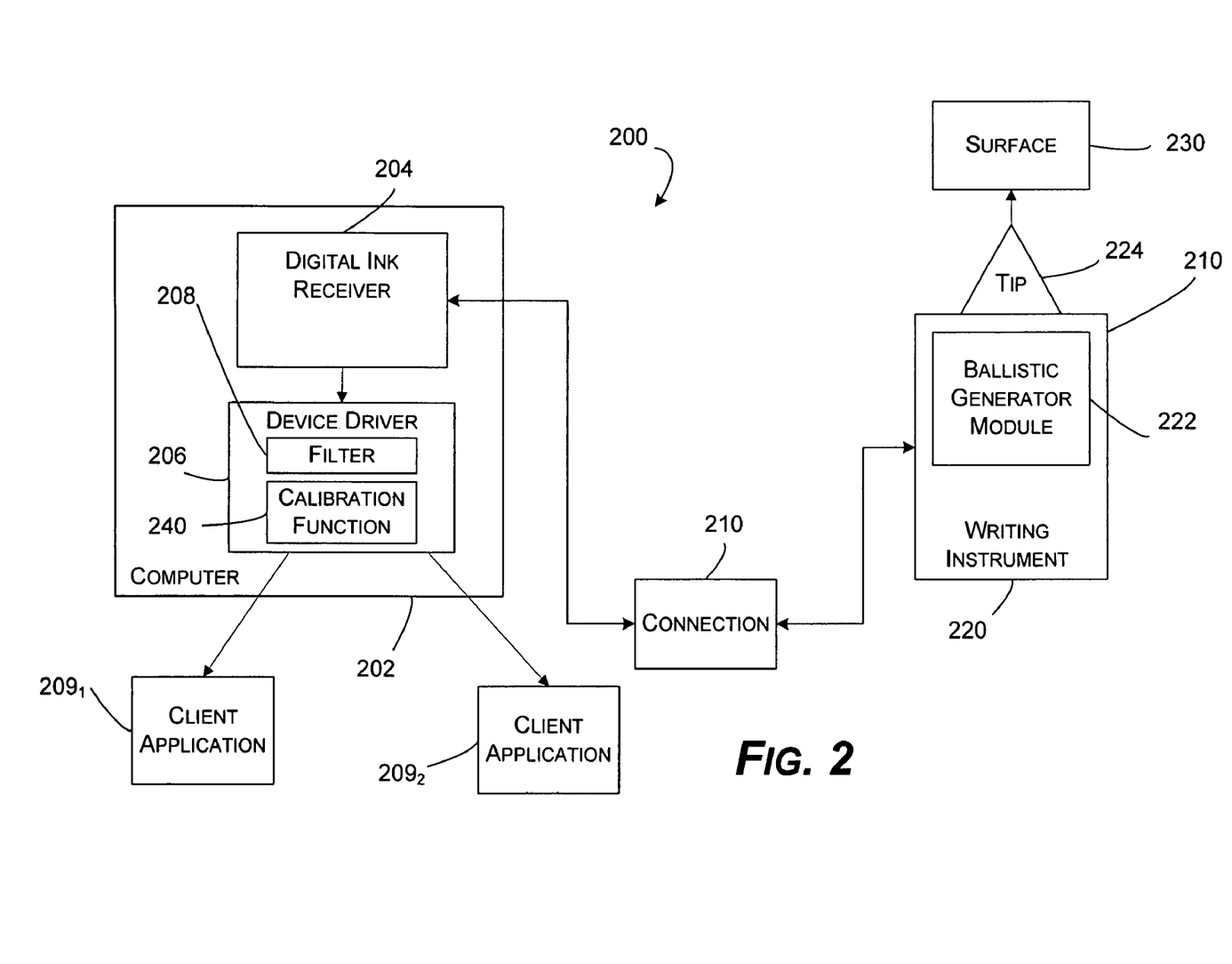
FIG. 2 is a block diagram representing an architecture for a system that incorporates an electronic module that generates writing movement information in accordance with one aspect of the invention.

Turning now to the drawings, FIG. 2 shows generally an architecture for a system 200 in which the present invention may be incorporated. The system 200 includes a computer 202 (e.g., the computer 110) having a digital ink receiver 204. In use, the digital ink receiver 204 is configured to receive raw data generated by a user's writing movements (described below), process that data if necessary, and forward corresponding appropriate data to a device driver 206. The device driver 206, in turn, is configured to notify interested client applications (e.g., operating system components or client applications $209_1$, $209_2$) of the data arrival, and forward that data to the client applications. The client applications may use the data as appropriate. As one example, a client application 209 may be a handwriting recognition software program that uses the data forwarded by the device driver in handwriting analysis or recognition. As another example, a client application 209 may be a display device that displays the data generated by the system 200.

A filter 208 may be included in, or otherwise may be associated with, the device driver 206. The function of the filter 208 is described below.

The computer 202 is connected via a connection 210 to a ballistic generator module 222 that is mounted in, or otherwise associated with, a writing instrument 220, such as a pen, stylus, pencil, paintbrush, stick, a pointer device, or any other mechanism through which a user may perform writing movements. As further described below, information about the writing instrument's movements is generated by the ballistic generator module 222 and is transmitted to the computer via the connection 210.

The connection 210 may be hardwired or wireless (wherein if wireless, the connection is conceptual, e.g., line-of-sight for infrared, or within range for FM transmissions, and so forth). As some examples, the computer 202 may be located remotely from the writing instrument 220, and transmission of information regarding movements of the writing instrument 220 to the computer may occur via a wireless transmission, a local area network (e.g., the LAN 171), a wide area network (e.g., the WAN 173), the Internet, or through another network or similar connection. Alternatively, writing information may be stored in memory in the writing instrument, and may be later downloaded to the computer 202, wherein the connection 210 may be a temporary hardwired or wireless connection, or a memory module from the ballistic generator module 222 (or the entire ballistic generator module for that matter) may be remove from the writing instrument and the data therein may be downloaded to the computer 202. In addition, some or all of the functions of the digital ink receiver 204 and/or the device driver 206 may be provided in the writing instrument and/or the ballistic generator module 222, although in practice, such a design may result in a mechanism that may be too cumbersome for comfortable writing.

The ballistic generator module 222 includes components that are configured to generate motion information, such as acceleration and/or tilt information, as a result of writing movements. The ballistic generator module 222 may include, for example, a dual-axis accelerometer, or a pair of accelerometers, or any other mechanism that is capable of generating data regarding information about movement or tilt of the writing instrument 220. Specific examples of components that may be used in the ballistic generator module 222 are described below.

The writing instrument 220 also preferably includes an appropriate tip 224 for writing on a surface 230 (e.g., paper, a touch-sensitive screen, or a writing tablet). The tip 224 preferably is designed for optimum writing on the surface 230, such as a blunt end for a touch-sensitive screen or tablet, or a pen point or nib for writing on paper.

In practice, a user grips the writing instrument 220 and writes with the tip 224 in a standard fashion, either on a writing tablet, or on an ordinary writing surface (e.g., paper). The ballistic generator 222 generates ballistic information regarding the writing instrument's movements and/or tilts, such as may be caused by a user's writing. If a touch-sensitive screen is utilized, additional digital ink information, such as calculated vector information, pressure, timing, strokes, angle of stylus, and the like, may be generated by the touch-sensitive screen or tablet. Some of this information may be sensed by one or more other sensors in the pen, and similarly transmitted to the computer 202.

The ballistic information is transferred to the computer 202 via the connection 210 and is received by the digital ink receiver 204. The digital ink receiver processes the data and forwards it to the device driver 206. As an example of what may be done to process the data, the digital ink receiver 204 may convert raw tilt data from an accelerometer to pitch and roll angles, as further described below.

The filter 208 may smooth or otherwise alter the data before the data is sent to the device driver 206 so that the data may be more usable. For example, the raw angle data (X and Y angle data) from the ballistic generator module 222 may be noisy, and the filter 208 may be used to smooth the output of each of the two channels of data independently, e.g., by using known smoothing programs or the like. As one example of a filtering solution, the following equation may be applied to a sequence of raw data to filter a channel of data:

$$y[n] = \sum_{m=-K}^{+K} x[n-m] \cdot f[m]$$

In the above equation, the output of the filter is denoted by y[n], and a channel sequence of raw data is denoted by x[n], with n being the sequence (time) index. The array f[m] gives the coefficients of the filter, and K is chosen to cover the range of non-zero f[m] values (i.e. f[±(K+1)]=0). Values may be arbitrarily chosen for f[m], but the following Gaussian profile works effectively:

$$f[m] = Z^{-1} \exp\left(\frac{-m^2}{\sigma^2}\right)$$

The factor Z is set such that the coefficients of the filter sum to unity (i.e., it is a weighted averaging filter). A filter width 'σ' may be chosen that gives a chosen, optimal performance. The larger the filter width σ, the smoother the filter. The appropriate value for σ should be determined subjectively and typically will depend on the sampling rate.

The filtered data is sent to the device driver 206, which in turn notifies interested client applications 209, e.g., via a notification message. The notification message sent to clients contains the filtered pitch and roll angles.

The client applications 209 may configure the properties of the device driver 206 according to how the client applications wish to utilize the incoming data stream. As one example, a display application may configure the data so that a display of the data is a specific correlation of the movements of the writing instrument 220. If such an application is used, the device driver 206 may be configured to include a calibration function 240 (i.e., calibration software) that is used to skew or stretch all input letters, symbols, or other writing input that have been entered by the user into a desired orientation relative to a point of reference. The calibration function 240 may thereby compensate for a user's handwriting style (e.g., angle of pen), as well as the orientation of the pen relative to mounting of the motion or tilt sensing components of the ballistic generator module 222. For example, the calibration function 240 may compensate for drawings that are interpreted on a display in a tilted position because of the orientation of the motion/tilt sensor.

By way of example, the calibration function 240 may be written so that all characters input by the writing instrument are displayed in an upright fashion (i.e., as would be normally seen without rotation). One way to perform such a function is to direct a user, upon the beginning of each use of the writing instrument 220, to draw a shape, such as a square. The shape that is generated by the data from ballistic generator module 222 may then be compared against the orientation and relative dimensions of a calibration square that is maintained elsewhere (e.g., in memory). The calibration square may, for example, be displayed on a computer screen relative to the data points generated by the ballistic generator module. Using this information, the software may create a calibration function 240 in the device driver 206 that may be used to skew or stretch all symbols that are input by the writing instrument 222. In this manner, characters are consistently altered to a predetermined relationship, such as in an upright, readable form.

Figure 3:
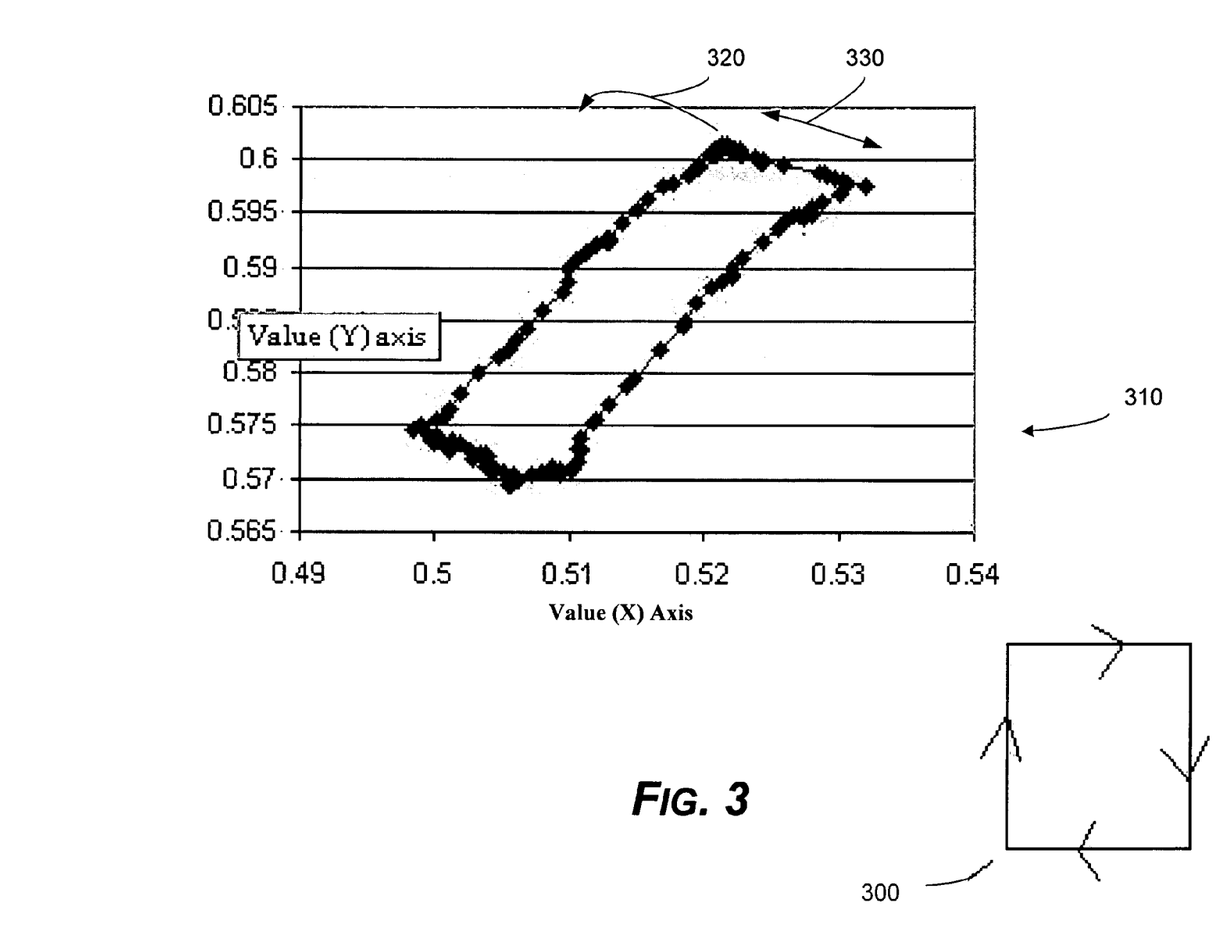
FIG. 3 is a representation of a graph of acceleration versus time generated by the electronic module of the present invention for an exemplary amount of handwritten data over time.

As an example, FIG. 3 shows a representation of a square 300 that may be drawn by a user with the writing instrument 220. The computer 202 generates a graph 310 that represents a plot of the X and Y positions of the data generated by the ballistic generator module 222. In the embodiment shown, the data points for the square are plotted as a parallelogram, with two sides being much longer than the other two, and the parallelogram rotated about 45 degrees from the original, written position. The rotation of the parallelogram is a result of the orientation of the pen in the user's hand. Thus, although the sides do not align vertically and horizontally in the graph plot shown in FIG. 3, rotating the writing instrument 220 in the user's hand may generate another set of data points that align with the vertical and horizontal axes in the graph. In any event, alignment of the data plots may not be critical for some applications, because the data points may be properly interpreted because they are read relative to one another, and not to the orientation of the graph 310. However, in some applications, such as a program that attempts to accurately display a user's handwriting movements on a display, the orientation is more important. For such a program, a calibration function may be utilized that effectively rotates the figure in accordance with the arrow 320 shown in FIG. 3, and stretches the figure in accordance with the arrows 330 (e.g., so that the shorter sides of the parallelogram can equal the longer sides). In this manner, a pen can be held in any position in the hand, and a drawing may be accurately reflected on the screen.

Figure 4:
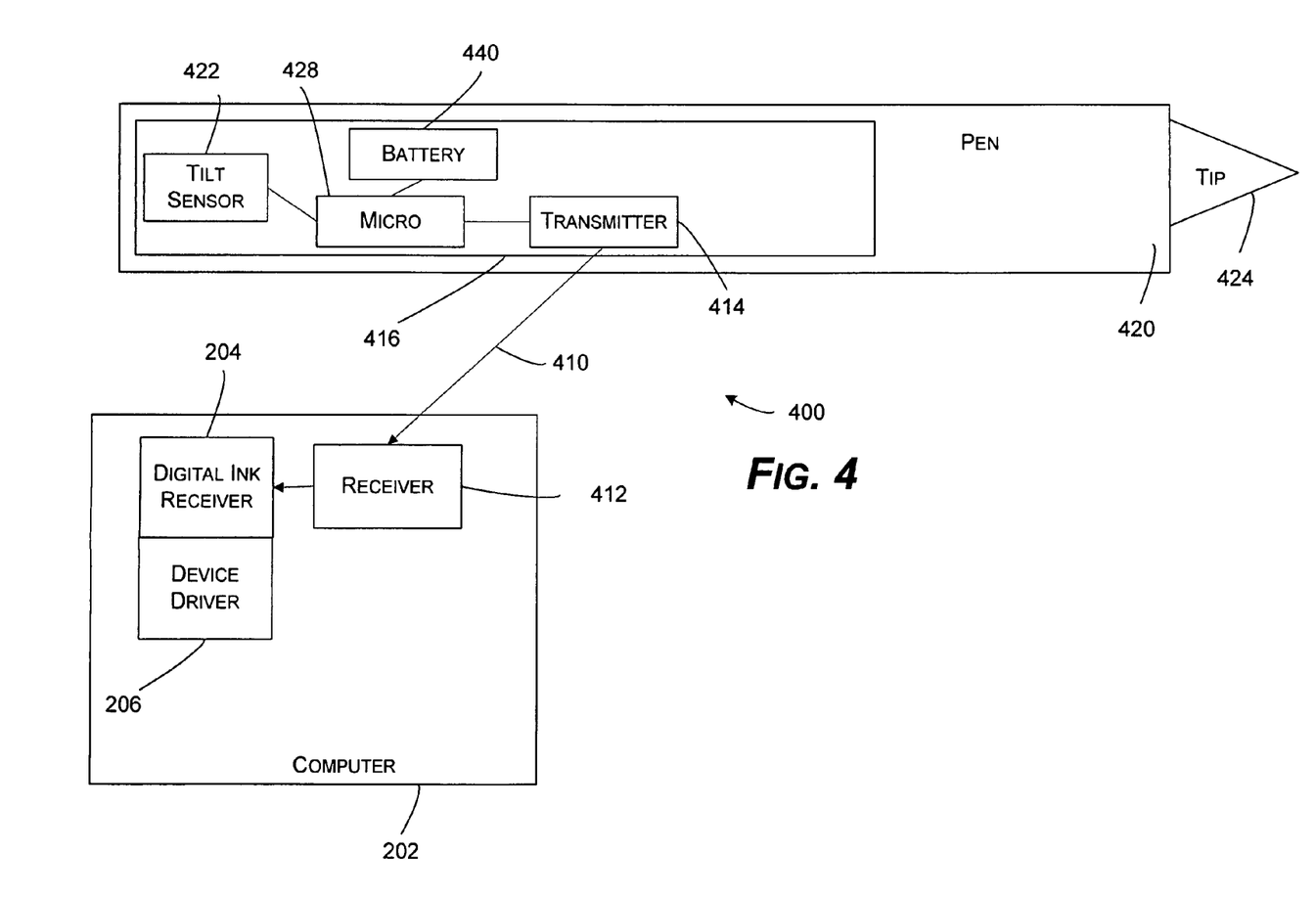
FIG. 4 is a block diagram representing an architecture of a more specific system utilizing an electronic module for generating digital ink information in accordance with an aspect of the invention.

FIG. 4 shows a representation of an embodiment of a digital ink generation system 400 that incorporates the present invention and that utilizes a wireless connection 410. The wireless connection 410 includes a receiver 412 at the computer 202, and a transmitter 414 in the electronic module 416 that is mounted in the writing instrument 420. The writing instrument 420 in the example shown in FIG. 4 is a pen 420.

The ballistic generator in the embodiment of FIG. 4 is an accelerometer 422. The accelerometer 422 is preferably a digital output accelerometer, such as the +/−2 g Dual-Axis Accelerometer with Duty Cycle Output produced by Analog Devices, Inc. of Norwood Mass., under the model number ADXL202E. If a digital output accelerometer is not used, an analog-to-digital converter 426 may be utilized to generate digital information. A microcontroller 428 is connected to the accelerometer and the microcontroller 428 is wired to the transmitter 414. A battery 440 is attached to the microcontroller 420 to provide power to the circuit. If desired, software (not shown) may be provided in conjunction with the accelerometer that permits movement detection of the writing instrument 420. In this manner, the accelerometer may be used to turn on and off the electronic module 416.

The accelerometer 422 is arranged to produce tilt data (i.e., the accelerometer is arranged to be used as a tilt sensor). When used as a tilt sensor, an accelerometer uses the force of gravity as an input vector to determine the orientation of an object. An accelerometer is most sensitive to tilt when its sensitive axis is perpendicular to the force of gravity, i.e., parallel to the earth's surface. At this orientation its sensitivity to changes in tilt is highest. Thus, for the dual-axis accelerometer to be used as a tilt sensor, it is preferred that the X and Y axes for the accelerometer be aligned perpendicular to the axis of the writing instrument 220, and parallel with the ground when the pen is in an upright position.

For the tilt sensor embodiment, mounting the tilt sensor 422 adjacent to the top end of the writing instrument 420 may produce the most accurate information, but the tilt sensor may be mounted in other locations as desired. The location of the tilt sensor 422 is dependent upon the location of the electronic module 416, which may be varied according to the particular application. For example, the electronic module 416 of the embodiment shown in FIG. 4 is mounted inside a pen 420, but the module may also be mounted on the outside of a writing instrument, for example when used with a paint brush or wooden pencil. In such an embodiment, the electronic module 416 may be attached by an elastic collar, glue, tape, rubber bands, or in any other suitable manner.

The dual-axis digital accelerometer (e.g., the ADXL202e accelerometer) generates ballistic angle movement information in response to movements of the writing instrument 220. Pen position data may be generated, for example, at 60 samples/sec/channel. The x and y channel data is read into the microcontroller 428 and is combined into a single channel of ASCII data for transmission by the transmitter 314, e.g., at 1200 Baud. The transmitter 314 may be, for example, a 433 MHz, AM transmitter having a range up to 30 meters. The transmission may or may not be encrypted.

The raw data from the accelerometer is received by the digital ink receiver 404, and is converted to pitch and roll angles in a manner known in the art (see, for example, the product literature for the ADXL202E, incorporated herein by reference). The pitch and roll angles may be filtered (e.g., by the filter 208) and/or compensated for (e.g., by the calibration component 240), and may be used by client applications, for example, to plot relative X and Y components, which represent the pen movements that are generated by a user.

The accelerometer 422 may be used to detect acceleration and deceleration, instead of tilt information. In such an embodiment, the relative acceleration and deceleration of the pen in the X and Y axes that is measured by the accelerometer 422 may be used to provide dynamic information regarding the motion of the pen and hence form a two-dimensional vector stream representing the pen movement. Other pen movement information may be extracted from, for example, a handwriting tablet, or sensors placed in the writing instrument 220. The additional pen movement information may also be used to extract vector information for handwriting recognition.

Figure 5:
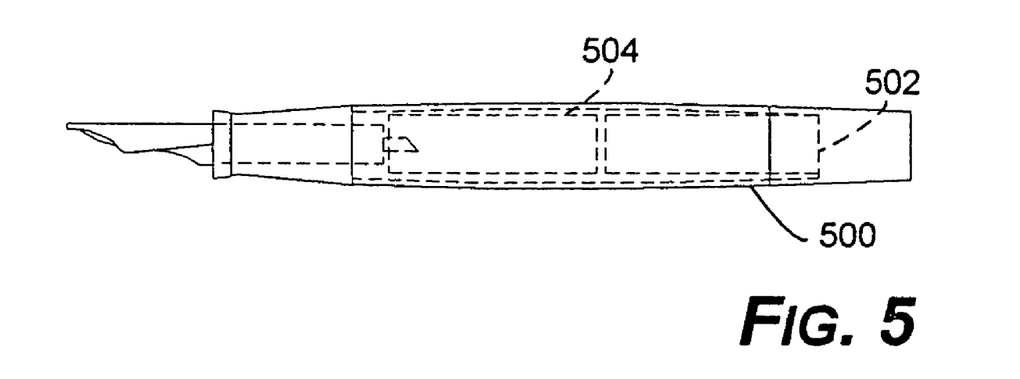
FIG. 5 shows a pen into which an electronic module in accordance with the present invention may be incorporated.
Figure 6:
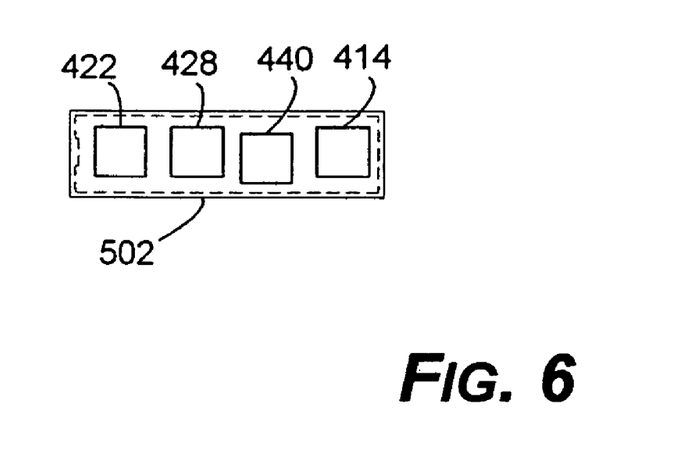
FIG. 6 shows an electronic module for the pen of FIG. 5.

FIG. 5 shows a contemporary fountain pen 500 in which an electronic module 502 made in accordance with the present invention may be inserted. Contemporary pens usually include two identical ink cartridges within the pen, a first ink cartridge 504 that supplies ink to the nib, and a second, spare cartridge that presses the first cartridge against the nib. In practice, the cartridges are switched when the first cartridge is empty, thus permitting a spare supply of ink to be carried with the pen. In accordance with one aspect of the present invention, the components of the electronic module 502 (e.g., the components described with reference to the module 416, as shown in the cartridge 502 in FIG. 6) may be mounted in a cartridge that is sized similar to one of the ink cartridges, and is placed in the position of the second cartridge. By mounting the components in this location, the pen functions normally as a writing instrument, and the user's writing experience is not altered. The components may alternatively be placed within an electronic module in the position of the first cartridge (i.e., the cartridge that supplies ink to the nib), although this arrangement requires either that the pen not be able to write, or that the components be shielded from, or impervious to, the ink.

The components in the electronic module 502 are relative inexpensive. If the pen 500 or the electronic module is lost, there is no security problem as user data kept is normally not kept within the pen. Because the electronic module 502 is mounted inside the pen 500, the module does not interfere with the user's handwriting motions or the aesthetic appearance of the pen. In addition, power on/off may be accomplished by movement detection, so no on/off switch would violate the outer shape of the user's pen.

The electronic module 502 provides additional benefits in that it may be used in a conventional pen, the use of which is known by virtually everyone. A user may simply begin writing, and the ballistic generator sends data regarding the user's writing movements to the computer 202. If the computer is a hand held device, for example, the user has a convenient, easy-to-use, and portable data input system.

An electronic module in accordance with the present invention may be implemented in a number of other ways. For example, in addition to the above-described embodiments, an electronic module may be incorporated as part of an ink cartridge that extends the length of a pen. Alternatively, an electronic module may be configured to fit into the end of a mechanical pencil, such as in an eraser slot. Other embodiments are contemplated.

Figure 7:
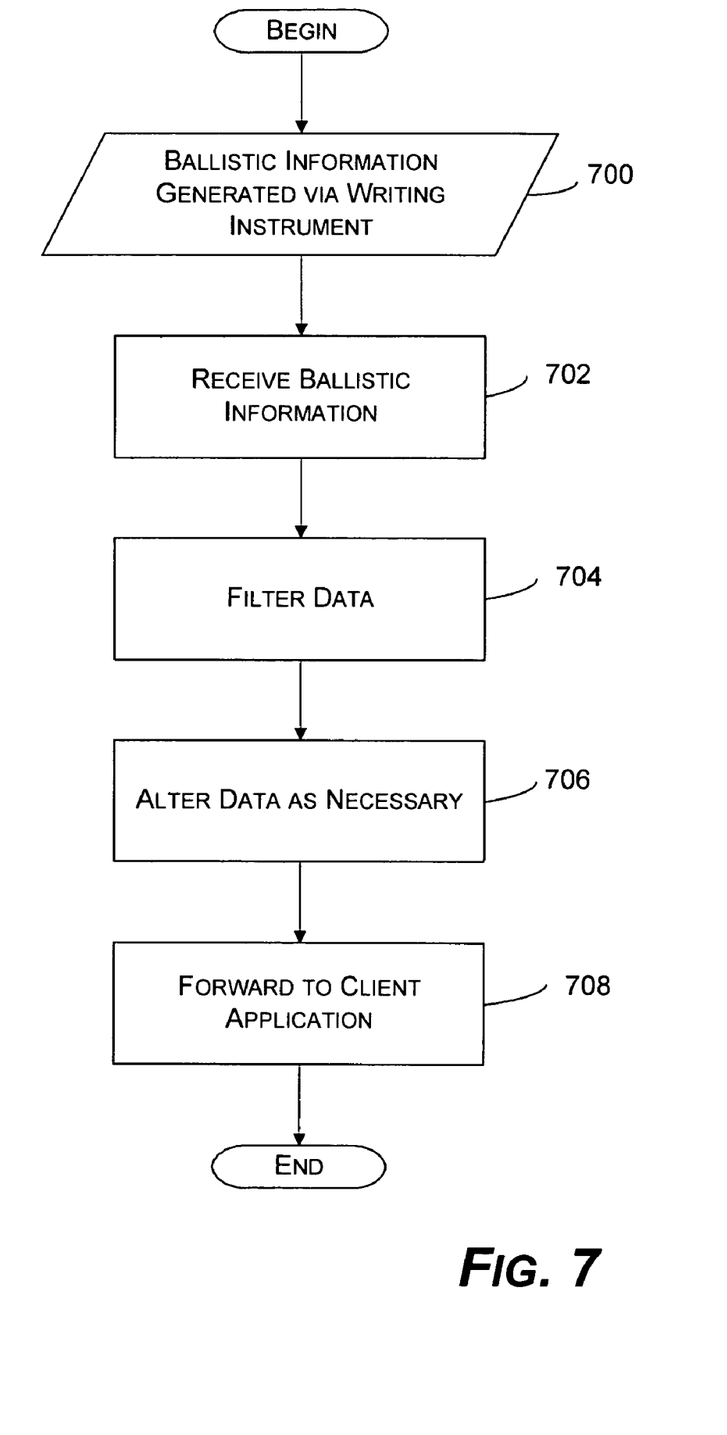
FIG. 7 shows a general overview of a process for generating digital ink information from writing input of a user using the electronic module in accordance with one aspect of the present invention.

Turning now to an explanation of the operation of the present invention, FIG. 7 shows a general overview of a process for generating handwriting data in accordance with one aspect of the present invention. Beginning at step 700, a user utilizes a writing instrument (e.g., the pen 320) to generate ballistic information. As discussed above, the ballistic information may be generated by an accelerometer or by a tilt sensor (e.g., an accelerometer arranged to collect tilt information) as a result of writing movements by a writing instrument incorporating the electronic module.

At step 702, the ballistic information is received by the computer 202 (e.g., through the connection 210). The data is then filtered by the filter 208 (step 704). As discussed above, this filtering process may utilize, for example, a Gaussian filtering technique. At step 706, the filtered data may then be altered as necessary (e.g., by the calibration function 240) for the software for which the data will be used. For example, the data may be stretch, rotated, and/or skewed so that it may be properly displayed on a monitor. The altered data is then forwarded to the appropriate application (step 708). The application may be, for example, recognition or display software.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A device for sensing writing movement, comprising:
an electronic module fully contained within a single container that is configured to be selectively and removably coupleable to a standard writing instrument of conventional size, shape and operation, the electronic module fully contained within the single container including all components necessary for generating raw data that can be translated by a remote computing system into x and y position data, including at least:
a ballistic generator that is configured to generate movement information resulting from writing movements; and a transmitter that is configured to transmit the movement information, as raw data, to a receiver of the remote computing system.

2. The device of claim 1, wherein the ballistic generator comprises an accelerometer.

3. The device of claim 2, wherein the accelerometer is configured to generate writing instrument tilt information.

4. The device of claim 1, further comprising a motion sensor within the electronic module fully contained within the single container, the motion sensor being configured to power on the electronic module upon detecting movement of the electronic module.

5. The device of claim 1, wherein the single container is shaped and size to generally correspond to a replacement ink cartridge for the standard writing instrument, such that the single container is configured to fit within a cavity of the writing instrument that is configured to receive a single replacement ink cartridge.

6. The device of claim 1, wherein the electronic module includes a power source.

7. The device of claim 1, wherein the electronic module includes a microcontroller.

8. A system of providing writing-related movement information to a computing device, comprising:

an electronic module fully contained within a single container having means for being selectively and removably coupled to a standard writing instrument of conventional size, shape and operation, the electronic module fully contained within the single container including all components necessary for generating data for translation by a remote computing device into at least x and y position data, the components including at least a ballistic generator means for generating movement information as a result of movement of the writing instrument;

means for providing the electronic movement information to the remote computing device; and means for filtering the electronic movement information to form filtered data.

9. The system of claim 8 further comprising means for providing the filtered data to a client application running on the remote computing device.

10. The system of claim 8, further comprising, means for providing calibration information to the computing device, and means for altering the filtered data in accordance with the calibration information.

11. The system of claim 10 wherein the means for providing calibration information to the computing device comprises means for providing electronic movement information corresponding to a known pattern to the computing device.

12. The system of claim 8, wherein the ballistic generator means comprises accelerometer means.

13. The system of claim 12, wherein the accelerometer means includes means for generating writing instrument tilt information.

14. The system of claim 8, further comprising means for selectively powering on the electronic module.

15. The system of claim 8, wherein the container fits within a cavity of the writing instrument that otherwise receives a single ink cartridge.

16. The system of claim 8, wherein the electronic module includes power means.

17. The system of claim 8, wherein the electronic module includes microcontroller means.

18. The system of claim 8, wherein the standard writing instrument comprises one of a pen, a pencil, or a paintbrush.

19. The system of claim 8, wherein the standard writing instrument includes means for writing on conventional paper.

20. A writing system, comprising:

a single container that selectively and removably couples to a standard writing instrument that writes on conventional paper, the standard writing instrument having a conventional size, shape and operation;

an electronic module fully contained within the single container, the electronic module including all components necessary for generating x and y position data, including at least a dual-axis accelerometer that generates movement information as a result of movement of the standard writing instrument, and a transmitter that communicates data corresponding to the movement information to a remote computing device for processing as digital ink such that no movement data is stored within the single container; and calibration mechanism for compensating for a user's particular handwriting style and translating the generated x and y position data into desired position data, wherein the calibration mechanism receives position data according to movement of the standard writing instrument corresponding to a predetermined pattern and, from the position data received by the calibration mechanism corresponding to the predetermined pattern, comparing the received position data to actual position data for the predetermined pattern, thereby generating calibration information for stretching and skewing received position data to compensate for the user's particular handwriting style.

* * * * *